Patented Dec. 19, 1944

2,365,405

UNITED STATES PATENT OFFICE 2,365,405

PLASTIFYING OF SYNTHETIC RUBBER

Erich Gartner, Cologne-Mulheim, and Albert Koch, Cologne-Dunnwald, Germany; vested in the Alien Property Custodian No Drawing. Application August 14, 1940, Serial No. 352,520. In Germany August 23, 1939

5 Claims. (Cl. 260—86.5)

The present invention relates to improvements in the plastifying of synthetic rubber-like materials.

The synthetic rubber-like materials which are obtainable by the emulsion polymerization of butadiene hydrocarbons or of mixtures from butadiene hydrocarbons and copolymerizable vinyl compounds show an inferior plasticity when compared with natural rubber. In consequence thereof, the workability of such products and the incorporation therewith of filling materials, vulcanizing agents etc. is connected with certain difficulties. These disadvantages have been overcome by subjecting the materials described to various plasticizing processes, which effect an increase of plasticity of the unvulcanized products without impairing the mechanical properties of the vulcanizates to any material extent. The plastifying operation which is mostly made use of in practice is by subjecting the polymerizates of the character described to oxidizing conditions in a solid state in the presence of anti-cyclicizing agents. This plastifying process can be accelerated by certain auxiliary agents such as phenylhydrazine or the products of the condensation thereof with aldehydes or ketones.

The processes described and in particular the process of Letters Patent No. 2,317,385 represent a distinct advance in the practical use of such polymerizates as a substitute of natural rubber. However, the behavior of such plastified products still leaves something to be desired. It has been observed that the plastified products show a certain recovery from plastification on storing. After a storing over a prolonged period of time, this recovery may be such as to remove for the most part the effect which has been achieved by the application of the plastifying process.

It is the object of the present invention to do away with these disadvantages and to develop a new type of auxiliary agents which allow one to prevent such recovery in an easy and economical manner. Other objects of our invention will be set forth in the following description, it being to be understood that the contents thereof are intended to generally explain our invention without limiting the same in any manner.

The auxiliary agents which are made use of in accordance with our present invention for preventing such undesirable recovery may be defined as 1,3,5-triaryltrimethylenetriamines. These products can be prepared in a manner known per se from an arylamine and formaldehyde in the proportion of 1:1 in the presence of water and in the absence of an acid catalyst. Products of the character described are also defined as anhydroformaldehyde-arylamines and correspond to the following formula

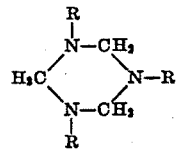

wherein R stands for an aromatic radical such as phenyl, substituted phenyl or naphthyl. These products are incorporated within the synthetic rubber-like materials to be stabilized subsequent to the plastifying process. In general, an amount of about 1 to 3% of the said stabilizing agents is sufficient to exert the desired result. It has been found that the presence of these auxiliary agents brings about a stabilization of the plastified polymeric butadiene hydrocarbons (this term including the mixed polymerizates of the character described) to such an extent that they can be stored for an unlimited period of time. This is true regardless as to whether the synthetic rubber-like materials are stored per se or in form of a non-vulcanized mixture containing filling materials, vulcanizing agents and the like. Such mixtures have proved to be particularly suitable for working the same on the calender and on the tubing machine. In each case, the resulting vulcanizates show excellent mechanical properties.

In the following we are giving some figures illustrating the effect which is achieved by our present invention. The comparative plasticity measurements have been performed in the following manner: A cylinder of the synthetic rubber-like material to be tested of 10 mms. in height and in diameter has been loaded at a temperature of 80° C. with such a weight as to impart thereto within 30 seconds a deformation to a height of 4 mms. The weights which are necessary for effecting such deformation are given below in grams and are an indication of the plasticity. Moreover, we are giving below the recovery from deformation in per cent of the deformation (i. e. of 6 mms.) which was to be observed within 30 seconds after removing the weight. Such figures are an indication of the elasticity of the unvulcanized product. The plasticizing measurements defined have been described by H. Hagen in "Kautschuk," volume 15, pages 88 to 95, this publication being referred to in "Chemical Abstracts,"

volume 33, No. 16, column 6647. By way of example, we are giving below the figures which have been obtained with a product of the conjoined emulsion polymerization of butadiene-1.3 and styrene in the proportion of 3:1 which has been subjected to a plasticization process in the present of phenyl-β-naphthylamine as anticyclicizing agent and thereupon has been stored for several days either per se or in the presence of 3% of a stabilizer of the character described. It is to be understood that these details are by no way limitative and that practically the same result has been obtained by replacing the said rubber-like material by other products of the character described such as those having a lower or higher styrene content and those being free from styrene at all or containing other copolymerizable vinyl compounds than styrene. In the following table, column I shows the behavior of the non-stabilized products and column II that of the stabilized material after a 0, 24, 36, 168, 336, 508 and 672 hours' storing, the first figure in each case representing the deformation in grams as defined above and the second figure the recovery from deformation in per cent as defined above.

|  | Hours | | | | | | |
| --- | --- | --- | --- | --- | --- | --- | --- |
|  | 0 | 24 | 36 | 168 | 336 | 508 | 672 |
| I | 280/53.1 | 310/57.1 | 280/55.1 | 300/55.3 | 280/55.6 | 310/59.2 | 320/59.7 |
| II | 250/52.7 | 230/51.1 | 240/50 | 240/50.2 | 235/50.7 | 230/50.5 | 230/50.3 |

It follows therefrom that the non-stabilized products show a gradual decrease of plasticity whereas no such effect is to be observed in the case of the stabilized material. This effect appears to be rather independent on the nature of the stabilizing agent provided that it falls within the above definition. The best results have been obtained with those products wherein R stands for phenyl or toluyl, and a somewhat inferior effect with those products wherein the phenyl contains as substituents halogen atoms or other radicals.

In the following we are describing some comparative tests which have been performed with various stabilizers of the character described. In this case the solubility of the synthetic rubber in benzene has been taken as an indication of the plasticity as the plasticity as well as the solubility are influenced by the degree of plasticization. These tests have been carried through by incorporating within an emulsion polymerizate of butadiene and styrene (3:1), which has been plasticized so as to become soluble in benzene, 3% of various stabilizers, dissolving the said stabilized materials in the 50 fold quantity of benzene each and measuring the time until these solutions show flocculation due to the becoming insoluble of the polymerizate. In the following table column I shows the arylamine which has been employed for the preparation of the anhydroformaldehydearylamine serving as stabilizer and column II shows the time in weeks which has expired until flocculation has occured:

| I | II |
| --- | --- |
| p-Toluidine | 16 |
| p-Chloroaniline | 12 |
| m-Toluidine | 6 |
| Mixture of o-, m- and p-toluidine | 6 |

The stabilizing effect of the auxiliary agents described can be observed also in vulcanizable rubber mixtures so that such mixtures can be stored prior to vulcanization without involving the danger that the workability thereof, for instance on the tubing machine, is impaired. This effect is illustrated by the following table showing the behavior of the following mixture on storing:

Parts

An emulsion polymerizate of butadiene and styrene (3:1) which has been plasticized in a manner known per se, for instance by subjecting it to oxidizing conditions at an elevated temperature in the presence of antioxidants --- 90
A low viscous sodium polymerizate of butadiene serving as plasticizer --- 10
Ebonite powder --- 50
Silicic acid --- 15
Mineral oil --- 5
Sulfur --- 32
Condensation product of ethylpropylacrolein and aniline as vulcanization accelerater --- 1.5

In the table column I shows the various amounts of anhydroformaldehydeaniline which have been incorporated within the said mixture subsequent to plasticizing, column II shows the plasticity and elasticity of the mixture prior to storing, and column III the same properties of the mixture after a 28 days' storing, the figures having been measured in the manner defined above with reference to the publication by H. Hagen.

| I | II | III |
| --- | --- | --- |
| 0 | 1,500/66 | 2,600/45 |
| 0.5 | 1,650/67 | 2,400/74 |
| 1 | 956/57 | 1,450/61 |
| 2 | 525/49 | 750/50 |
| 3 | 500/42 | 600/47.5 |
| 5 | 400/46 | 400/45 |

In order to avoid any misunderstandings we wish to point out that the stabilizer exerts a certain softening effect on the polymerizate. In consequence thereof, the plasticity of the polymerizate prior to storing is the better the higher a content of the stabilizer is employed.

We claim:

1. The process of treating materials obtained by plasticizing synthetic rubber-like emulsion polymerisates selected from the group consisting of polymeric butadiene-1:3-hydrocarbons and of mixed polymerisates of butadiene-1:3-hydrocarbons with styrene by subjecting the same to an oxidizing treatment in the presence of free oxygen and anti-oxidants at an elevated temperature, which comprises incorporating within the plasticized polymerisates from 1 to about 3% thereof of an anhydroformaldehyde-arylamine, whereby the tendency of such polymerisates to lose their plasticity is reduced.

2. A plastic composition resistant to loss of plasticity which comprises from 1 to about 3% of an anhydroformaldehyde-arylamine and the plastic polymerisates obtained by subjecting synthetic rubber-like emulsion polymerisates selected from the group consisting of polymeric butadiene-1:3-hydrocarbons and mixed polymerisates of butadiene-1:3-hydrocarbons with styrene, to an oxidizing treatment in the presence of free oxygen and antioxidants at an elevated temperature.

3. The process as claimed in claim 1 wherein there are incorporated within the plasticized synthetic rubber-like material from 1 to about 3% thereof of anhydroformaldehyde-aniline.

4. The process as claimed in claim 1 wherein there are incorporated within the plasticized synthetic rubber-like material from 1 to about 3% thereof of anhydroformaldehyde-toluylamine.

5. A plastic composition as in claim 2, in which the anhydroformaldehyde-arylamine is anhydroformaldehyde-aniline.

ERICH GARTNER.
ALBERT KOCH.